US009473505B1

(12) United States Patent
Asano et al.

(10) Patent No.: US 9,473,505 B1
(45) Date of Patent: Oct. 18, 2016

(54) MANAGEMENT OF THIRD PARTY ACCESS PRIVILEGES TO WEB SERVICES

(71) Applicants: Shoichiro Asano, Tokyo (JP); Koji Suzuki, Tokyo (JP); Kenji Kase, Tokyo (JP)

(72) Inventors: Shoichiro Asano, Tokyo (JP); Koji Suzuki, Tokyo (JP); Kenji Kase, Tokyo (JP)

(73) Assignee: Trend Micro Inc., Tokyo (JP)

( * ) Notice: Subject to any disclaimer, the term of this patent is extended or adjusted under 35 U.S.C. 154(b) by 69 days.

(21) Appl. No.: 14/542,421

(22) Filed: Nov. 14, 2014

(51) Int. Cl.
  *G06F 21/00* (2013.01)
  *H04L 29/06* (2006.01)

(52) U.S. Cl.
  CPC .................... *H04L 63/102* (2013.01)

(58) Field of Classification Search
  CPC ... H04L 63/102; H04L 67/10; G06F 21/604; G06F 21/62; G06F 21/6245
  USPC ............................................................ 726/4
  See application file for complete search history.

(56) References Cited

U.S. PATENT DOCUMENTS

| | | | | |
|---|---|---|---|---|
| 6,393,569 B1 * | 5/2002 | Orenshteyn | ........... | G06F 9/5055 709/203 |
| 2002/0104015 A1 * | 8/2002 | Barzilai | ............... | G06F 21/604 726/1 |
| 2002/0173295 A1 * | 11/2002 | Nykanen | ................ | H04L 63/10 455/414.1 |
| 2012/0072991 A1 * | 3/2012 | Belani | ................... | H04W 4/001 726/25 |
| 2013/0227636 A1 * | 8/2013 | Bettini | .................. | H04W 4/001 726/1 |

OTHER PUBLICATIONS

Joshi, James Bd, et al. "Security models for web-based applications." Communications of the ACM 44.2 (2001): 38-44.*

* cited by examiner

*Primary Examiner* — Syed Zaidi
(74) *Attorney, Agent, or Firm* — Beyer Law Group LLP (57) ABSTRACT

A user clicks on a link on a third-party Web site from his computer in order to utilize a third-party application with a Web service with which the user has an account. The application contacts the Web service and requests permissions from the user's account. The Web service sends the request to the user's computer asking to grant these permissions to the application. A software module on the user's computer intercepts this request, retrieves a user profile for this Web service, and compares the permissions requested with the permissions allowed from the profile. If any requested permissions are not allowed then the module automatically denies granting permissions and the user is not presented with an option of granting the request. A warning screen may be displayed. If all requested permissions are allowed then the request is presented to the user. A profile may apply to more than one Web service.

14 Claims, 8 Drawing Sheets

FIG. 5A
User Profile

FIG. 5B
User Profile

User Profile

MANAGEMENT OF THIRD PARTY ACCESS PRIVILEGES TO WEB SERVICES

FIELD OF THE INVENTION

The present invention relates generally to prevention of malicious software on computers and mobile devices. More specifically, the present invention relates to controlling the access privileges of third-party applications to a user's device.

BACKGROUND OF THE INVENTION

Currently, many users of computers and mobile telephones make use of popular Web sites such as Twitter, Facebook, DropBox, etc., in order to use the services that the these Web sites provide. In addition, there are many third-party software applications designed for use with these Web sites that provide additional services for a user. Typically, a third-party application will require that the user grant the application access privileges to the user's account for the Web site in question.

Unfortunately, some of those third-party applications are malicious and may take actions that the user does not expect and does not want, even though the user has previously granted the application access to his or her account. When the user grants the application access privileges, he or she typically cannot imagine the risks involved in granting these access privileges. Access privileges are granted without the user exercising due care or without knowing the meaning of the access privileges granted.

Figure 1:
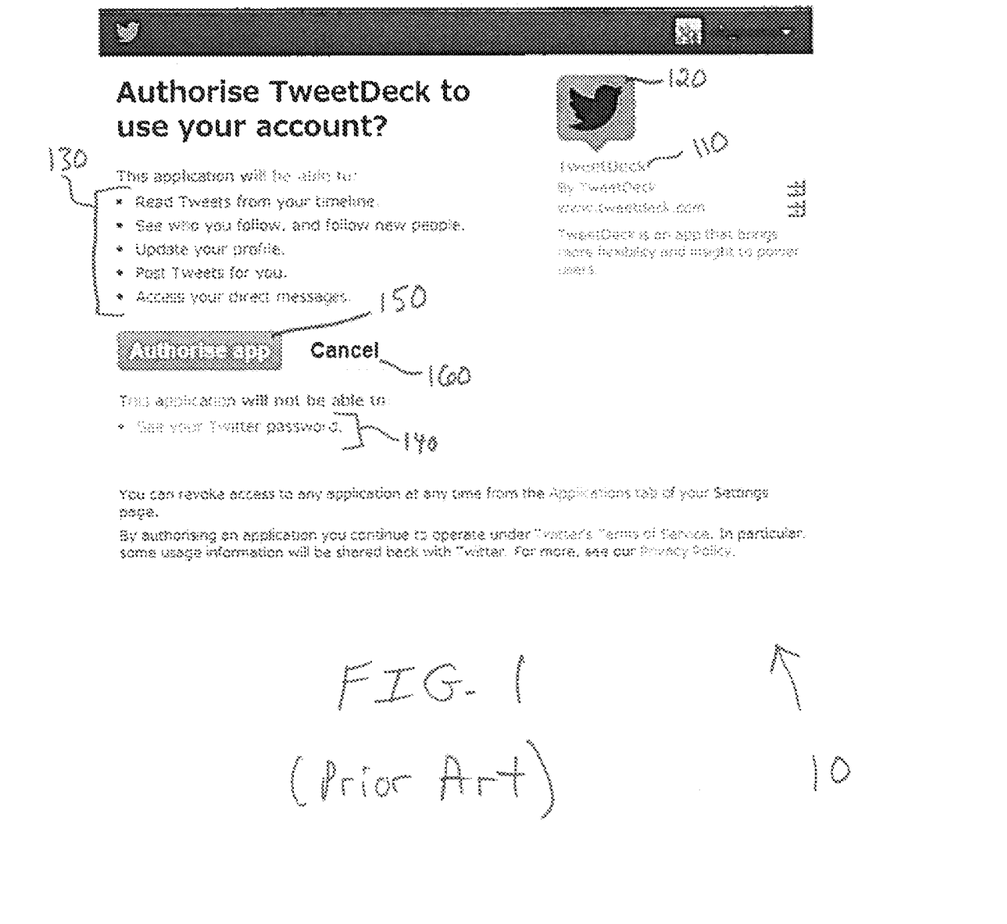
FIG. 1 shows a prior art window in which a user is being asked to grant access privileges to a third-party application.

FIG. 1 shows a prior art window 10 in which a user is being asked to grant access privileges to a third-party application. In this example, the user uses the Web site Twitter and desires to use a third-party application 110 in order to take advantage of additional services offered by that application. When the application connects to Twitter, the user is routed to the Twitter Web site asking the user if the application should be allowed to access the user's Twitter account. Shown is the source of the third-party application 110 and the logotype or name 120 associated with the Web site. Presented to the user is a list 130 of general actions that the application will be able to perform once the application has access privileges. Also shown is a list 140 of actions that the application will not be able to perform. The user may then choose a button 150 to authorize the application or button 160 to cancel the transaction. Unfortunately, many users do not pay attention to these actions or do not understand them, and may authorize an application without enough consideration.

Using this example, if a malicious application were to be granted access privileges the user's Twitter account, that application would be able to post messages on behalf of the user. These messages could be undesirable, false, provide a link to a malicious Web site, etc. The user would thus unknowingly take part in the spreading of false information, malicious sites and spam, and user's reputation would suffer on the Twitter service. Or, if an application were granted access to contact information and also network access, the user's information might be leaked over the Internet.

In addition, the application would be able to follow an undesirable Twitter account. The user may receive a message from an unknown user that might be false, unethical, spam, or contain a link to a malicious site. The user could inadvertently perpetuate fraud or fall victim to malware if the message is acted upon. Further, a malicious application would be able to edit the user's profile within Twitter. The user's photograph or profile may be changed to provide unflattering or incorrect information, thus causing the user's reputation to suffer.

In general, the problem with granting access privileges to third-party applications to a Web site and service that the user uses regularly is that it can be difficult for a user to understand precisely what privileges he or she is granting. And, because he or she is in a rush, the user may authorize access carelessly or simply by custom, or may not understand the explanation given, without reading the explanations. Therefore, a new system and techniques are desirable that would assist a user in granting access privileges to third-party applications only when the user understands the risks associated with granting access.

SUMMARY OF THE INVENTION

To achieve the foregoing, and in accordance with the purpose of the present invention, a system is disclosed that automatically decides whether to grant privileges to a third-party application.

Security policies for third-party applications are managed on a profile server and require a user to follow their own policies when granting access privileges to third-party applications. Embodiments allow a user to take advantage of the innovative system whether the user is using a browser on a computer or software on a mobile device such as a mobile telephone.

In a first embodiment, a user desires to use a third-party application on a potentially malicious Web site and clicks on a link from his or her computing device. The third-party application is designed to be used in conjunction with a particular Web service with which the user has a user account. The application contacts the Web service and requests particular permissions from the user's account. In turn, the Web service then sends a request to the user's computing device asking if the user will grant these permissions to the third-party application. A software module executing on the user's computing device intercepts this request, retrieves a user profile for this Web service, and compares the permissions requested with the permissions allowed from the user profile. If any requested permissions are not allowed then the software module automatically denies granted permissions to the third-party application. The user is not presented with an option of granting the request.

In a second embodiment, a user desires to use a third-party application on a potentially malicious Web site and clicks on a link from his or her computing device. The application contacts the Web service and requests particular permissions from the user's account. In turn, the Web service then sends a request to the user's computing device asking if the user will grant these permissions to the third-party application. A software module executing on the user's computing device intercepts this request, retrieves a user profile for this Web service, and compares the permissions requested with the permissions allowed from the user profile. If any requested permissions are not allowed or are deemed risky by the user profile, then the software module displays a warning screen on the computing device, and also presents the request from the web service giving the user the option of granting the request.

In a third embodiment, a user desires to use a third-party application on a potentially malicious Web site and clicks on a link from his or her computing device. The application contacts the Web service and requests particular permissions from the user's account. In turn, the Web service then sends a request to the user's computing device asking if the user will grant these permissions to the third-party application. A software module executing on the user's computing device intercepts this request, retrieves a user profile for this Web service, and compares the permissions requested with the permissions allowed from the user profile. If none of the requested permissions are not allowed or are deemed risky by the user profile, then the software module allows the request from a Web service to proceed unhindered and the request is displayed on the computing device. The user is thus given the option of granting the request.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned, a user may authorize a third-party application in haste, an explanation may be inconspicuous or confusing, or the user may not fully understand precisely what access privileges are being granted and what the ramifications are. By providing an automated check of a user's own security policy, granting of access privileges to malicious third-party applications can be prevented.

Figure 2:
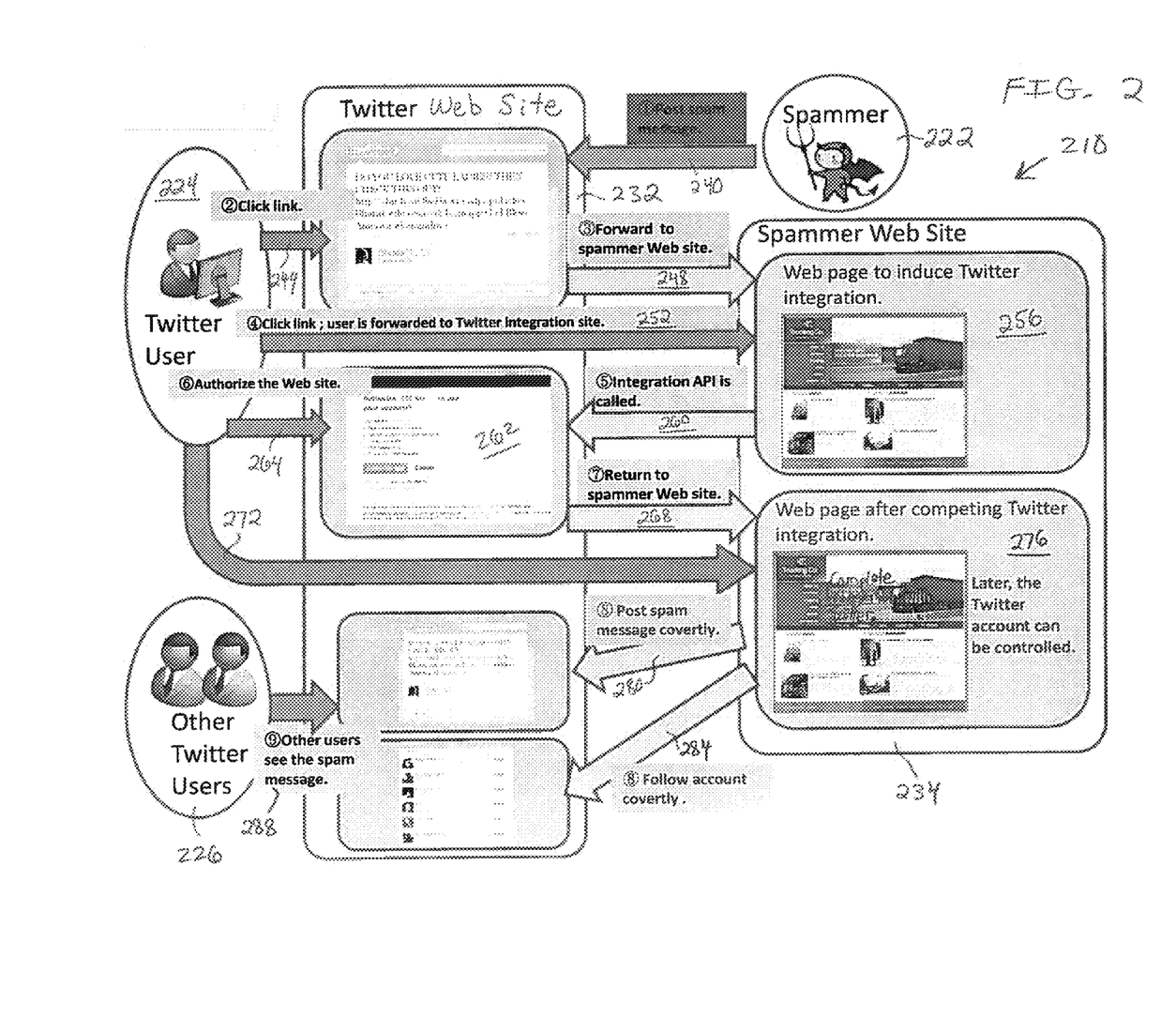
FIG. 2 is a more detailed illustration of how a malicious third-party application can take advantage of an unsuspecting user.

FIG. 2 is a more detailed illustration of how a malicious third-party application can take advantage of an unsuspecting user. A review of this process helps provide motivation for a solution to this problem.

Shown is an unscrupulous individual 222 with access to a computer and who has implemented a third-party application to be integrated with a user's Twitter account (for example). Also shown is a Twitter user 224 having access to a computer or mobile device, and other Twitter users 226. The Twitter Web site is shown at 232 by which users post messages, read messages, follow other users, etc., using their computers or mobile devices. Web site 234 is a site operated by individual 222 through which the third-party application may be downloaded or accessed. In many instances, Web site 234 may appear normal, that is, it may not be readily apparent that it is a malicious Web site.

In a first step 240, individual 222 posts spam or otherwise malicious message that becomes available via the Twitter Web site. In a second step 244, user 224 views this Twitter message on their computer or mobile device and clicks on a link within the message. In a third step 248, the device of user 224 is redirected to the spammer Web site 256, where the user is presented with one or more third-party applications that the user may click on to choose.

In a fourth step 252, the user selects one of the applications (by clicking on a link, for example) and the user's browser (or device) will be forwarded to a Twitter integration page 262 on the Twitter Web site. Before the third-party application can be used with the user's Twitter account, the application must be integrated with the Twitter service which involves receiving authorization from the user. Accordingly, in a fifth step 260, the spammer Web site calls an integration API on the Twitter Web site and the user's browser is then redirected to this Twitter integration page 262 on the Twitter Web site. This page may appear as shown in FIG. 1 and may also require a user name and password.

In a sixth step 264 the user authorizes the third-party application by entering authorization credentials and by clicking a button on page 262, perhaps without fully understanding which access privileges are being granted or without understanding the risks. Once the third-party application has been authorized, typically the user is then redirected back to the spammer Web site. In a seventh step 268 the user's browser is redirected back to page 276 on the spammer Web site and is shown a message indicating "Complete Integration with Twitter." At this point, the third-party application of the spammer Web site 234 has been granted any of a variety of access privileges to the user's Twitter account.

Because the spammer Web site (via the third-party application) has access privileges to the user's account, user's Twitter account can be controlled in various manners by the unscrupulous individual 222. For example, in an eighth step 280, individual 222 can post spam messages covertly onto the Twitter service purportedly from user 224; these messages may be false, involve rumor, contain malicious links, etc. Or, in a step 284 individual 222 may follow the user's account covertly and the user will not realize that another entity is monitoring his actions on the Twitter service. Finally, in a ninth step 288 any number of other Twitter users 226 may view the Twitter posts and links that have been posted covertly by individual 222. Again, the user has a problem because he or she has authorized the third-party application without full consideration of the risks involved.

Management System User Interface

Figure 3:
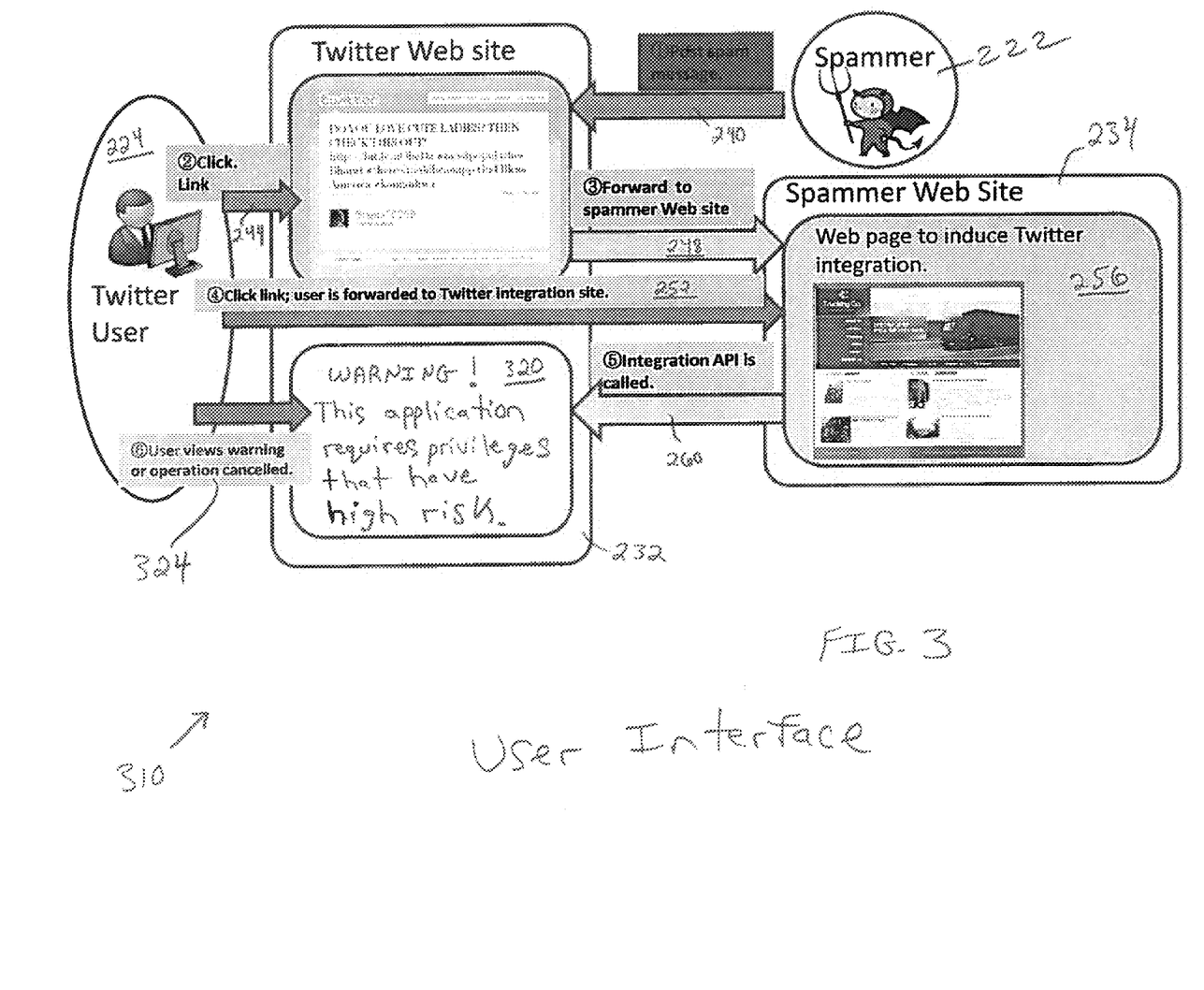
FIG. 3 illustrates a user interface of a security policy management system for managing access privileges.

FIG. 3 illustrates a user interface 310 of a security policy management system for managing access privileges. As explained in FIG. 2, a spam message may be posted and a user may respond as shown in steps 240-260. When the third-party application, though, requests integration via the Twitter Web site 232, this request is intercepted by a software application on the user's computing device. This software application checks a previously stored security policy unique to the user and may automatically provide a warning or may cancel the request of the third-party application. Shown in window 320 is a warning to the user indicating that the third-party application is requiring privileges that have high risk. In a sixth step 324 user 224 may view the warning displayed on his or her computing device or may view an indication that the request of the third-party application has been canceled.

If only a warning is displayed, the user may then be presented with window 10 (for example) and may then choose to authorize the third-party application or not, having taken the warning into consideration. If the request of the third-party application is automatically canceled, then the user will not be able to utilize the third-party application in conjunction with his or her desired Web site. In this situation, a summary of the permissions requested and the user's profile may be presented to indicate to the user why request was canceled.

Management System

Figure 4:
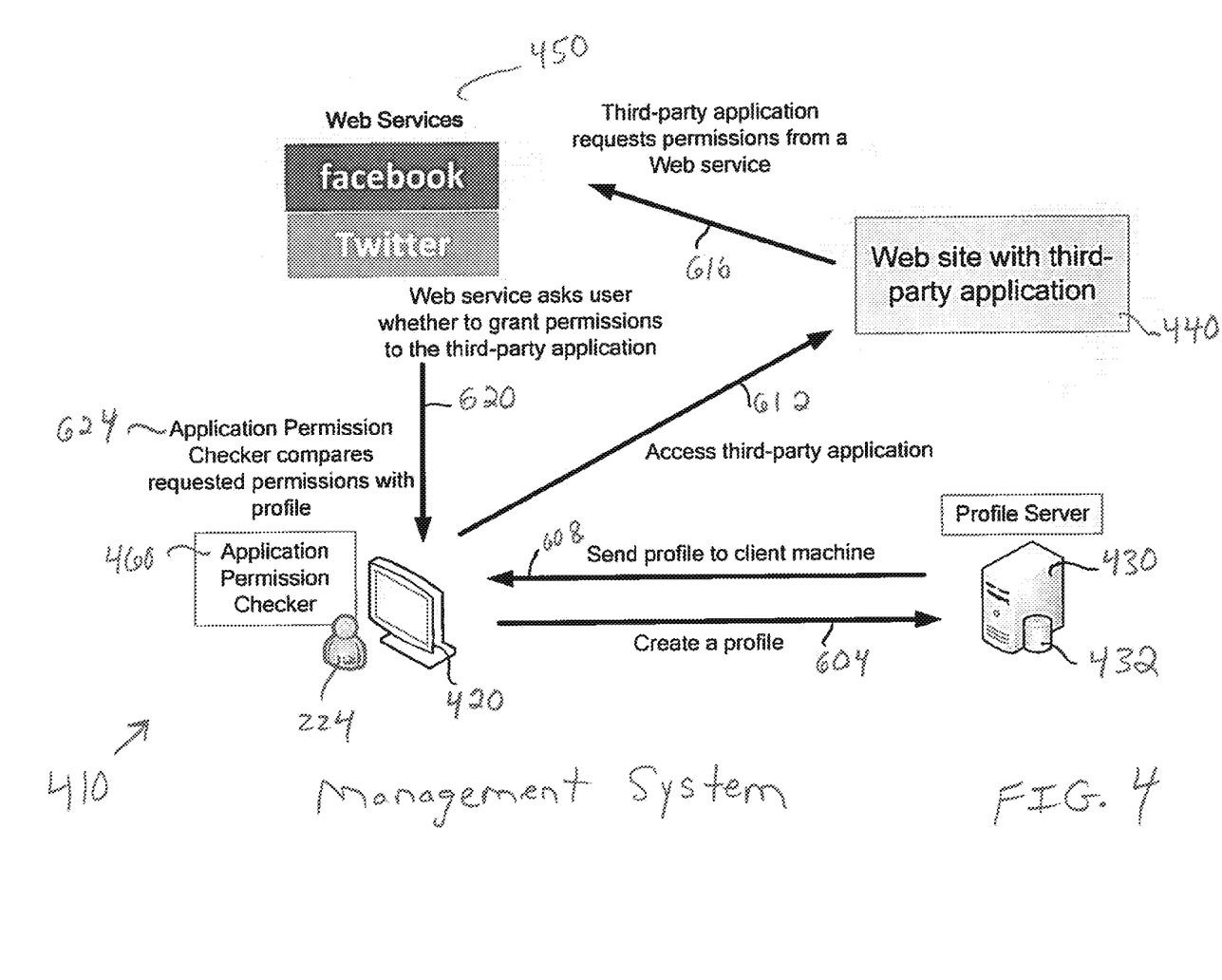
FIG. 4 illustrates a management system used to control access privileges to a Web service user account.

FIG. 4 illustrates a management system 410 used to control access privileges to a Web service user account. Shown is a user 224 operating a computing device 420 (such as a mobile telephone, tablet computer, laptop computer, etc.) which is in communication with a profile computer server 430 having a database 432. A remote Web site 440 may host one or more third-party applications intended to augment a particular Web service. Of course, it is possible that a third-party application may be malicious. Any number of Web services 450 are provided by Web sites accessible over the Internet by user 224.

The user need not necessarily log into a Web Service (such as Twitter) for the system to operate. For example, if a user wishes to integrate an application with Twitter, requesting integration allows the user to see what kind of permissions are required, even before logging in to Twitter. If acceptable, in order then to authorize an application for integration, the user will need to input a user name and password, then push the "authorize application" button. If the user has already logged in, the user name and password field will not be shown. The user simply pushes the "authorize application" button. In another example, if a user wishes to integrate an application with Facebook, the user will not be able to see the permissions required until the user log in. In most cases, the user will eventually need to log in in order to finally authorize the application.

If a computer, computing device 420 includes an operating system (such as that available from Microsoft Corporation) and an Internet browser (such as the Chrome browser). In this embodiment, the software module application permission checker 460 may be implemented as an extension of the Internet browser.

The application permission checker 460 operates to compare permissions requested by third-party application with a profile previously established by the user in order to determine if the permissions requested are allowed by the user's profile. In this fashion, the decision whether or not to allow access privileges to a user's account is done automatically and with due consideration.

In a first step 604, user 224 creates a profile which includes a security policy regarding permissions to be granted to third-party applications. The user may create a single profile to be used with all Web services with which he has an account, or may create a different profile for each Web service he uses. Preferably, the user accesses profile server 430, and, utilizing a service on that server, create the user profile which is stored in database 432. In addition to creating his own profile, the user may simply accept a default recommended profile for use with a particular Web service or services. The user may also accept the default profile and then customize it for his own use for a particular Web service. Once the profile has been created and stored on profile server 430, in step 608 the profile is sent back to the client machine and stored within the user's Internet browser for later use.

Figure 5A:
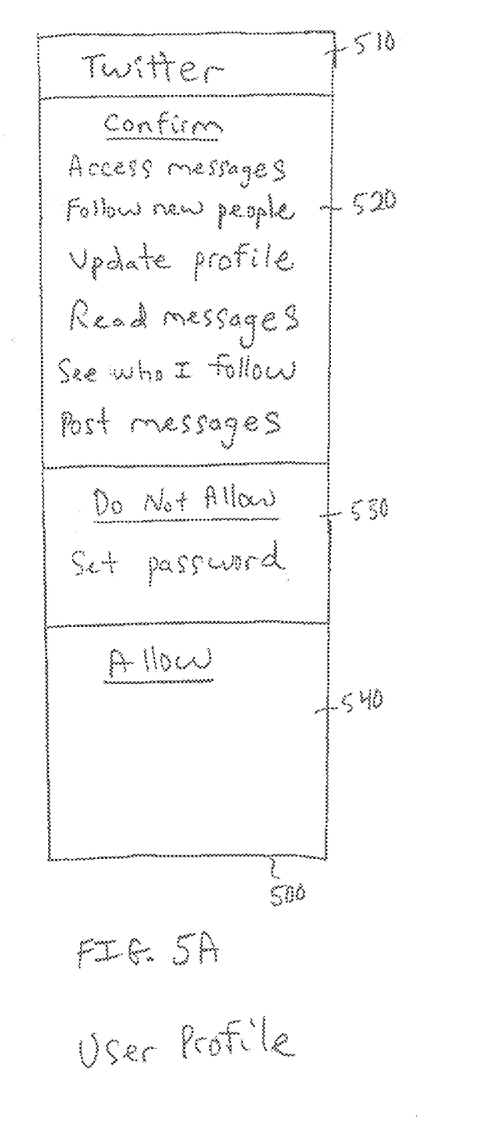
FIGS. 5A and 5B show examples of user profiles.
Figure 5B:
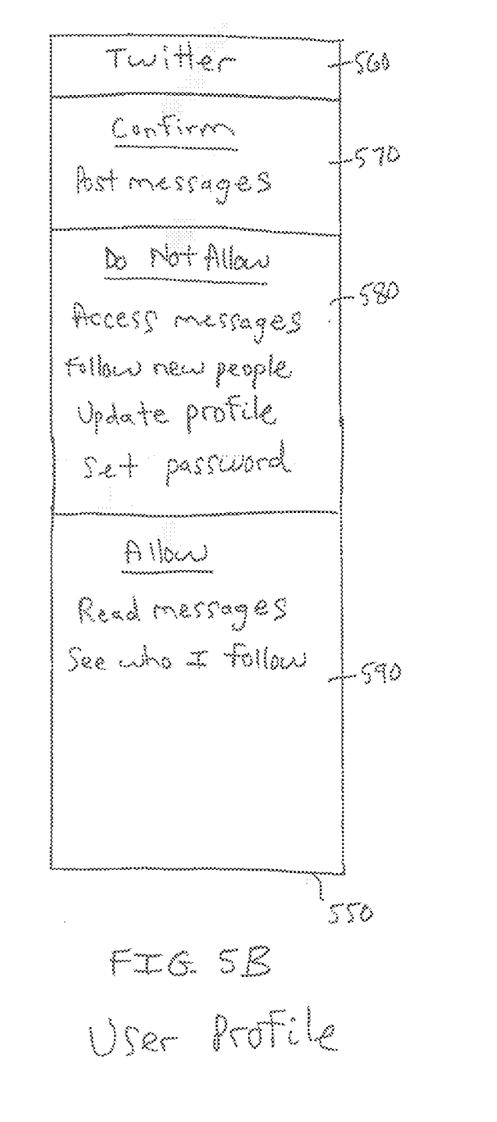

FIGS. 5A and 5B show examples of user profiles. FIG. 5A shows a recommended or default user profile 500. Default profile 500 may be available on profile server 430 and downloaded to the user's browser even if the user does not create a profile for a particular Web service. Or, the user may simply select this profile in lieu of creating his or her own profile. In this fashion, any of a variety of Web services will always be protected by a default user profile even if the user does not create one. The profile includes the name of the applicable Web service 510, a list of permissions 520 that must be first confirmed by the user before the third-party application is granted these permissions, a list of permissions 530 that are never allowed by the third-party application, and a list of permissions 540 that the third-party application is allowed to have. In this example of the specific Web service, Twitter, the default is that no permissions are granted automatically, a third-party application is never allowed to change the user's password, and a handful of permissions may be granted only after the user has seen these permissions explained on-screen and has explicitly granted authorization for each one.

FIG. 5B shows a custom user profile 550. In this example, the user has created his or her own custom profile for a particular Web service 560, or has modified the default profile. This profile includes a single permission 570 that must be confirmed by the user, a handful of permissions 580 that a third-party application is never allowed to have, and two permissions 590 that a third-party application is always allowed to have. Of course, there may be other permissions associated with this particular Web service, and permissions may vary greatly from one Web service to another. And, other actions aside from "Confirm," "Do Not Allow," and "Allow," may be present within any user profile such as "Allow for this session only," "Allow for a particular time period," "Allow for designated users only," "Confirm only upon entry of user password," etc.

Figure 7:
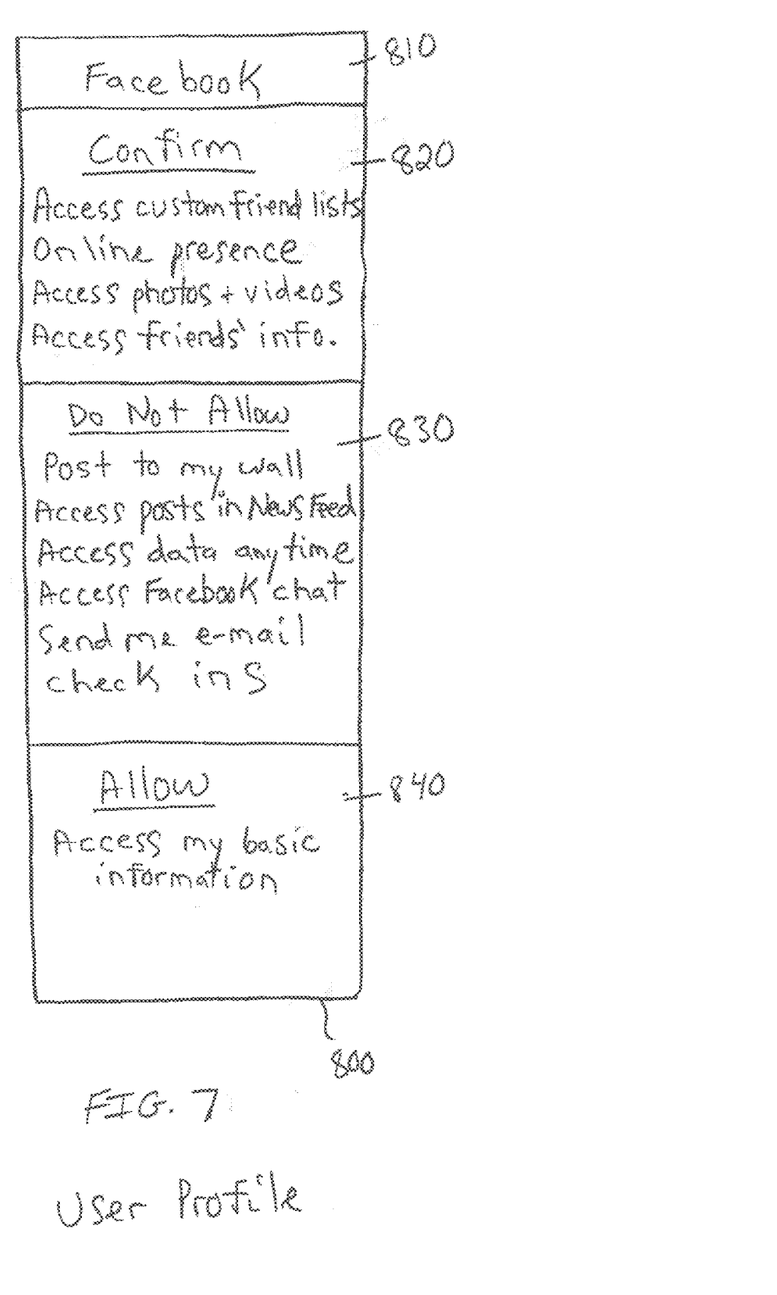
FIG. 7 show another example of a user profile.

FIG. 7 shows an example of a Facebook user profile 800 that may be used with more than one Web site. This profile includes permissions 820 that must be confirmed by the user, a number of permissions 830 that a third-party application is never allowed to have, and permission 840 that a third-party application is always allowed to have. Here is an example of how this profile may be used. A user creates profile 800 which is stored on server 430. The user attempts to integrate an application from a Web site by clicking the integration button on the Web site. If a requested permission is not allowed (such as "Post to my wall," the integration may not be allowed. If the user then views another Web site with a different Facebook application, the same steps will be performed and integration may be allowed or not. Thus, one profile may be used with more than one Web site.

Once any number of user profiles for any number of Web services have been sent back to the user's computer 420, the user may at some point attempt to access a third-party application in step 612 in order to augment his or her experience with a particular Web service 450. Accordingly, the user accesses Web site 440 in order to integrate the third-party application into the chosen Web service such that the third-party application may be granted certain access privileges to the user's account. Preferable, the user does not need to download the third-party application or data onto his or her computer during this process; only a Web browser is needed.

Next, the Web site 440 contacts the chosen Web service in step 616 in order to request various permissions of that Web service so that the third-party application will have certain access privileges to the user's account. In step 620 the chosen Web service 450 formulates an appropriate query and corresponding Web page and forwards that to the user in order to ask the user whether permissions requested by the third-party application should be granted. For example, such a query is shown in FIG. 1. The Web site will know the user's account only after the user grants permission to the Web site to integrate. Even if the user has already logged in to a Web service, the Web site will not know the user's information until after the user grants permission.

As explained above, though, in one embodiment, the user will not see the query (such as the one shown in FIG. 1) because the query will be intercepted by a software module application permission checker executing within the browser of the user's computing device. (In another embodiment, the permissions requested by the third-party application are displayed to the user even if the operation will be canceled automatically.) For example, when the permission checker is implemented as an extension of the Chrome browser, this extension will be able to intercept the query. The permission checker first checks the URL requested, and, if it matches that of the Twitter authentication page, then the checker runs a script to check the permissions requested by the third-party application before the user's device is able to display the Twitter authentication page 262 (for example). In other words, the browser will load the Twitter authentication page 262 but will not be able to display it because the checker intercepts the URL and displays the warning page if necessary.

Once the query is intercepted, the script in step 624 will then compare the user profile for the chosen Web service with the permissions requested in the authentication page. For example, if request 620 originates from the Twitter Web service, then the script will retrieve profile 550 corresponding to the Twitter Web service (assuming the user has created this custom profile) from where stored in conjunction with the user's browser. The checker may retrieve the user's profile in the following manner. The Chrome extension on the client computer will download the profile from the profile server 430. This job may be performed periodically or on computer start-up. The extension will have the profile or profiles and will apply them when the user encounters the authentication page of a Web service. The script knows which user profile to retrieve by way of a user log in. For example, the user logs in initially to the profile server with a user account specifically for the permission checker service of this management system. Then user can then download his or her own profile only from the profile server.

Next, the script compares each permission in fields 570-590 with the permissions requested by the third-party application, for example, the list of permissions 130 in FIG. 1. In one embodiment, the script may only compare permissions that are not allowed 580 with permissions requested by the third-party application. Assume that one of the permissions not allowed is "access messages." For example, the script parses the HTML code of the intercepted authentication page and checks to see if any "div" element which has a class "permissions allow" includes a list tag of "access your direct messages" (e.g., "<li>'access your direct messages.'</li>"). If so, then warning message such as message 320 may be displayed to the user. Or, the operation may be canceled automatically.

In other embodiments, permissions 590 are allowed by the third-party application, permission 570 needs to be confirmed by the user, and the permissions "access messages," "follow new people," and "update profile" requested by the third-party application in list 130 will not be allowed. The script implemented by application permission checker 460 may then take any of a variety of actions depending upon the permissions set by the user and what is found in the HTML code of the authentication page. Because some requested permissions will not be allowed, the checker may simply display an advisory page to the user indicating that the operation has been canceled and that the third-party application will not be allowed to execute because it has requested certain permissions that are not allowed according to the user's profile. Or, the checker may display a warning page indicating that the third-party application has requested permissions that are not allowed, and request the user to confirm the requested permission 570. The user may confirm the requested permission and in this way override the warning indicated by the checker. Or, the checker may redirect the user's browser to another Web page such as by forcing a "click" of the "cancel" button instead of the user. Where will user's browser will be redirected depends on the Web Service. For example, Twitter redirects to a page offering links to Twitter or to the application home page if the user is already logged in. If not logged in, the user is redirected to the Twitter home page.

In another embodiment, it is conceivable that all of the permissions requested by the third-party application are allowed by the user's profile. In this situation, the checker would automatically allow the third-party application to access the user's account and be granted all of the requested permissions. In another embodiment, the permissions requested by the third-party application are either allowed by the profile or need be confirmed by the profile. In this situation, the checker simply presents a confirmation page to the user explaining which permissions need be confirmed and requesting confirmation. Once the user confirms, then the third-party application is allowed access privileges to the user's account. Of course, other actions are possible depending upon the type of actions present in the user's profile.

Figure 6:
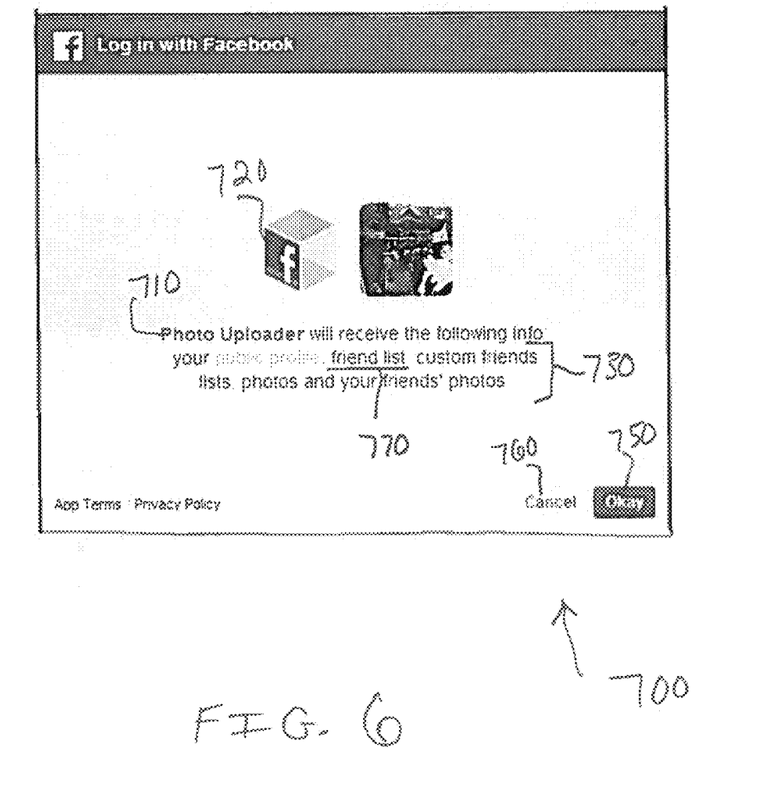
FIG. 6 illustrates another example in which a third-party application is requesting access privileges via a particular Web service.

FIG. 6 illustrates another example in which a third-party application is requesting access privileges via a particular Web service. In this example, the user uses the Web site Facebook and desires to use a third-party application 710 in order to take advantage of additional services offered by that application. When the application connects to Facebook, the user is routed to the Facebook Web site and in the prior art page 700 would normally be presented to the user asking the user if the application should be allowed to access the user's Facebook account. Shown is the source of the third-party application 710 and the logotype or name 720 associated with the Web site. Presented to the user is a list 730 of user account information that the application would like to access once the application has access privileges. The user may then choose a button 750 to authorize the application or button 760 to cancel the transaction.

Using management system 410, though, the application permission checker 460 intercepts this page, compares the requested permissions (i.e., access to the user's public profile, friend list, custom friend lists, photographs and friends' photographs) with the user's profile previously established for the Facebook Web service and stored on server 430. Assuming that the user's profile does not allow any third-party applications to view his "friend list," then in step 624 the checker 460 will alert the user that the "Photo Uploader" application is requesting information that is not allowed. The checker is able to automatically cancel the operation, provide details and allow the user to override the user profile, provide warning page indicating that the operation will be canceled and the reason why, etc. Preferably, the user never sees page 700 because the checker application automatically compares the requested permissions with the user's profile and makes a decision on behalf of the user. At most, the user would see a warning page from the checker application or perhaps a confirmation page from the checker application with a detailed explanation of the requested permissions and the risks involved. In some embodiments, all the user would see after clicking on a link in step 252 is an advisory from the checker indicating that the operation has been cancelled and that use of the third-party application is not allowed. If the operation is automatically canceled, the application permission checker then automatically "pushes" cancel button 160, thus informing Twitter (for example) that the third-party application will not be able to access the user's account.

The specific action taken by the checker is configurable by the user using the checker application on his or her computing device. The present invention is applicable to any of a variety of other Web services such as Dropbox, Amazon Simple Notification Service (SNS), Mixi SNS, etc.

Computer System Embodiment

Figure 8A:
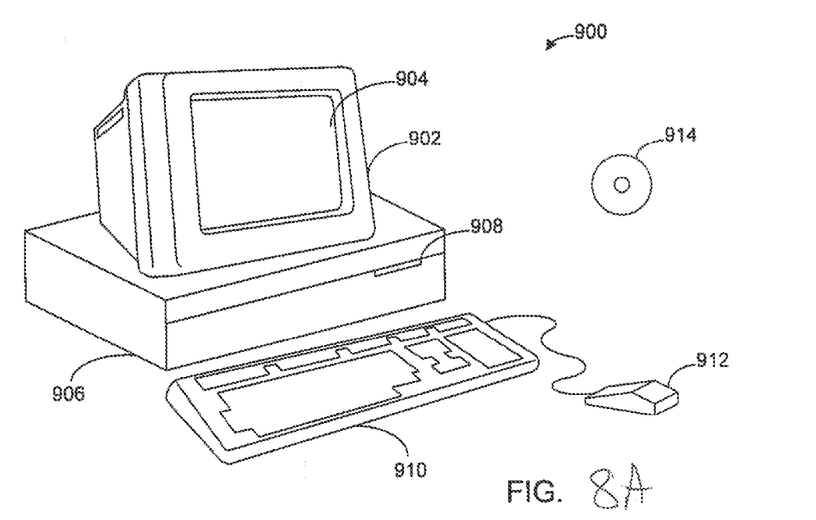
FIGS. 8A and 8B illustrate a computer system suitable for implementing embodiments of the present invention.
Figure 8B:
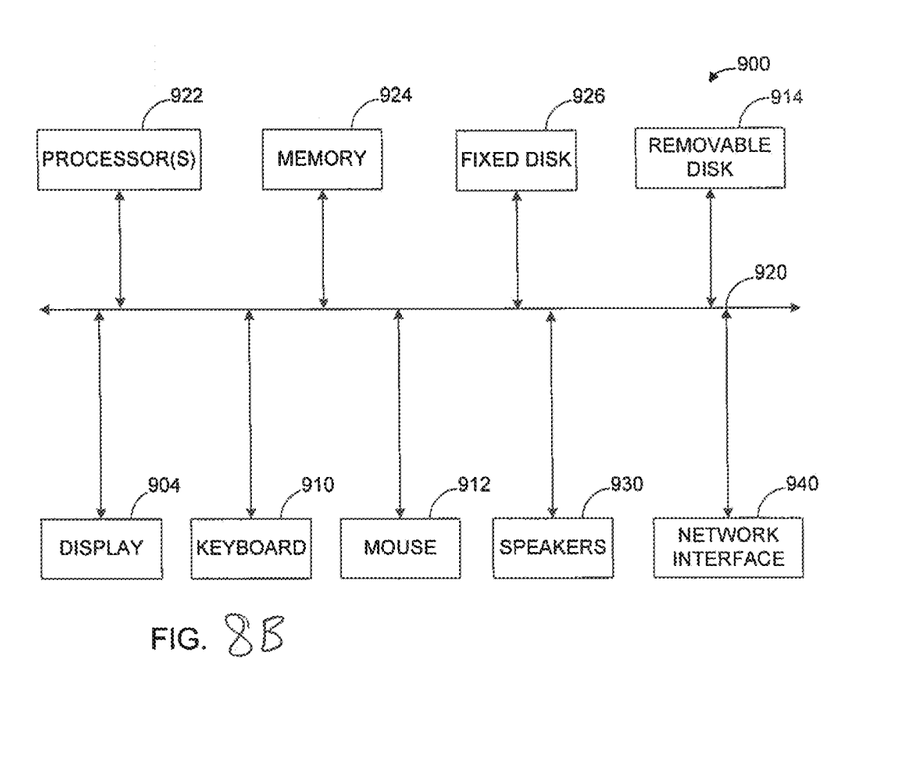

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of managing access to a user's user account at a Web service, said method comprising:
receiving a selection from said user on a computing device to access a third-party application on a remote Web site, said Web site not having access to said user account on said Web service;
intercepting a request from said Web service at said computing device to grant authorization to said third-party application to access said user account, said request including permissions requested of said user account;
retrieving, at said computing device, a user profile of said user that includes permissions of said user account that are risky if granted to said third-party application;
comparing said requested permissions with permissions of said user profile that are risky; and
displaying a warning message on said computing device when at least one of said risky permissions of said user profile matches with at least one of said requested permissions.

2. The method as recited in claim 1 wherein said request from said Web service is prompted by a request from said third-party application sent to said Web service to access said user account.

3. The method as recited in claim 1 further comprising:
retrieving said user profile from a remote profile computer server.

4. The method as recited in claim 1 further comprising:
displaying on said computing device said permissions of said request.

5. The method as recited in claim 1 further comprising:
displaying on said computing device an option to grant said requested authorization.

6. The method as recited in claim 1 further comprising:
receiving on said computing device a selection from said user to grant said requested authorization to said third-party application.

7. The method as recited in claim 1 further comprising:
receiving on said computing device a selection from said user to deny said requested authorization to said third-party application.

8. A method of managing access to a user's user account at a Web service, said method comprising:
receiving a selection from said user on a computing device to access a third-party application on a remote Web site, said Web site not having access to said user account on said Web service;
intercepting a request from said Web service at said computing device to grant authorization to said third-party application to access said user account, said request including permissions requested of said user account;
retrieving, at said computing device, a user profile of said user that includes at permissions of said user account that are allowed to be granted to said third-party application;
comparing said requested permissions with permissions of said user profile; and
allowing said request from said Web service to be displayed on said computing device when said requested permissions do not include a permission that said user profile lists as being risky or not allowed.

9. The method as recited in claim 8 wherein said request from said Web service is prompted by a request from said third-party application sent to said Web service to access said user account.

10. The method as recited in claim 8 further comprising:
retrieving said user profile from a remote profile computer server.

11. The method as recited in claim 8 further comprising:
displaying on said computing device said permissions of said request.

12. The method as recited in claim 8 further comprising:
displaying on said computing device an option to grant said requested authorization.

13. The method as recited in claim 8 further comprising:
receiving on said computing device a selection from said user to grant said requested authorization to said third-party application.

14. The method as recited in claim 8 further comprising:
receiving on said computing device a selection from said user to deny said requested authorization to said third-party application.

* * * * *